US005664758A

United States Patent [19]

Smith

[11] Patent Number: 5,664,758

[45] Date of Patent: Sep. 9, 1997

[54] EXTENDABLE MONOPOD STRUT DEVICE FOR MUSICAL INSTRUMENT

[76] Inventor: Leland B. Smith, 8728 E. Hinsdale Ave., Englewood, Colo. 80112

[21] Appl. No.: 378,198

[22] Filed: Jan. 25, 1995

[51] Int. Cl.[6] .................... F16M 3/00

[52] U.S. Cl. .................... 248/688; 84/385 A

[58] Field of Search .................... 248/688, 692, 248/188.5, 222.11, 221.11, 221.12, 225.12, 161, 408, 125; 403/321, 325, 377, 109; 84/385 A, 387 A, 379

[56] References Cited

U.S. PATENT DOCUMENTS

| | | | |
|---|---|---|---|
| 2,498,459 | 2/1950 | Schroetter | 84/280 |
| 2,800,737 | 7/1957 | Crossan | 248/188.5 |
| 2,803,983 | 8/1957 | Dowling | 84/382 |
| 2,847,892 | 8/1958 | Lass et al. | 84/380 |
| 2,861,767 | 11/1958 | Oves et al. | 248/356 |
| 2,933,968 | 4/1960 | Hearne, Jr. | 84/380 |
| 3,024,690 | 3/1962 | Sanstead | 84/387 A |
| 3,192,817 | 7/1965 | Schmidt | 84/327 |
| 3,266,766 | 8/1966 | Linville | 248/359 |
| 3,811,357 | 5/1974 | Stewart | 84/387 A X |
| 3,988,958 | 11/1976 | Brunkow | 84/380 |
| 4,348,935 | 9/1982 | Bay | 84/380 R |
| 4,841,829 | 6/1989 | Lehmann | 84/385 |
| 4,909,658 | 3/1990 | Townsend | 403/321 X |
| 5,050,827 | 9/1991 | Christie et al. | 248/125 |
| 5,086,930 | 2/1992 | Saeks | 248/161 X |
| 5,297,771 | 3/1994 | Gilbert | 248/688 |

FOREIGN PATENT DOCUMENTS

| | | | |
|---|---|---|---|
| 535727 | 11/1955 | Italy | 84/379 |

*Primary Examiner*—Ramon O. Ramirez

*Attorney, Agent, or Firm*—John B. Phillips

[57] ABSTRACT

An extendable strut device supports a reed woodwind musical instrument, such as an oboe, clarinet, English horn or straight saxophone, to substantially relieve the weight on the musician's thumb and hand, thereby avoiding muscle fatigue and strain and repetitive motion injuries, without limiting the position, flexibility or maneuverability of the instrument and without inducing other unnatural or restrictive posture or feel requirements in the instrument. The strut device comprises an attachment component having a connection mechanism adapted to connect pivotally to the thumbrest without interfering with the conventional placement and position of the musician's thumb on the thumbrest, and an elongated monopod component having an upper end connected to the attachment component and having a lower opposite end adapted to contact the seating facility upon which the musician is seated while playing the instrument. A method of supporting the instrument using the strut device is also described in which the length of the monopod component is adjusted.

31 Claims, 7 Drawing Sheets

3/7

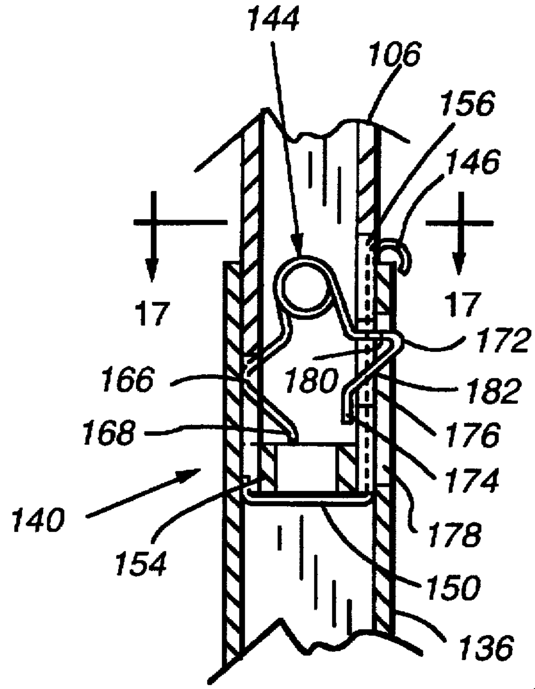
Fig. - 15
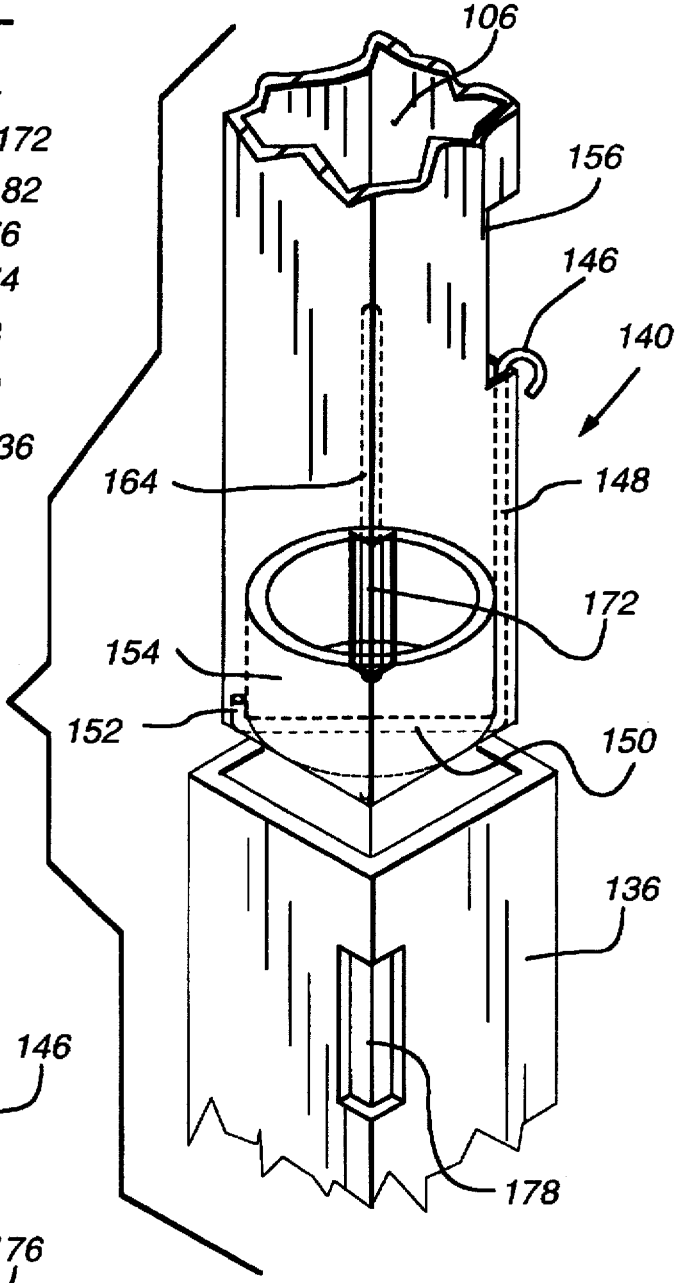
Fig. - 16
Fig. - 17
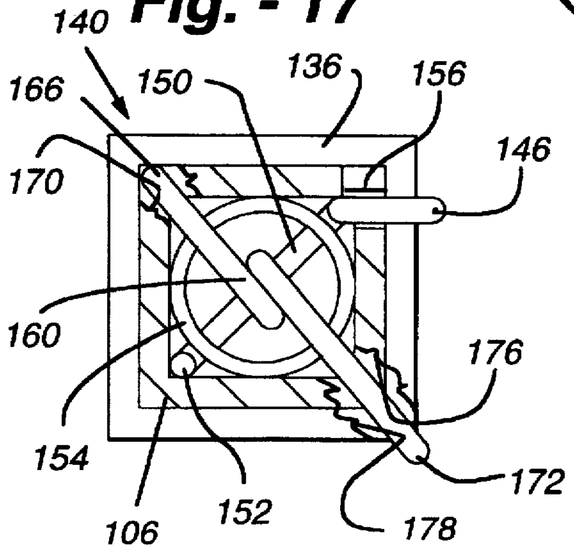

EXTENDABLE MONOPOD STRUT DEVICE FOR MUSICAL INSTRUMENT

This invention relates to musical instruments of the type which are substantially supported by a thumb or hand of the musician while they are being played, such as an oboe, clarinet, English horn or straight saxophone. More particularly, the present invention relates to a new and improved apparatus and method to support weight of the instrument from a chair or other seating facility upon which the musician is seated while playing the instrument, thereby relieving the musician of the muscle strain and fatigue previously involved when playing the instrument over prolonged time periods.

BACKGROUND OF THE INVENTION

Certain reed woodwind musical instruments, such as the oboe, the clarinet, the English horn and the straight saxophone, require the musician to hold the instrument by the musician's mouth embouchure and by the musician's hands, while simultaneously requiring the embouchure to be flexible enough to achieve the desired range of reed vibration and requiring the fingers to be flexible and moveable enough to move all of the keys when playing the instrument. One consequence of these requirements for simultaneous stability and flexibility is that the support arrangement for the instrument can not limit the flexibility of the musician's fingers or mouth. As a result, an oboe, clarinet, English horn and straight saxophone all include a thumbrest which rests on the thumb of the musician's right hand. The right hand thumb contacts the body of the instrument leaving the remaining fingers of the right hand fully unrestricted to contact the key pads of the instrument. The fingers and the thumb of the musician's left hand are all available to contact key pads.

The substantial majority of the weight of the instrument is supported by the thumb of the musician's right hand, since the embouchure can not support the weight of the instrument and still remain flexible enough to play the instrument, and because the fingers of the left hand must remain free to contact the keypads. As a result, considerable strain in the hand and on the right thumb may be experienced by the musician during prolonged musical performances or practice sessions. The stresses are aggravated when the hand and finger positions are changed to non-ergonomic positions to attempt to compensate for the strain. For professional and student musicians, the strain may become so unbearable and thus hinder the ability to play the instrument. Worse still, repeated strain may cause severe and permanent injuries of a nature similar to repetitive motion injuries. Promising musical careers have been compromised or abandoned because of an inability to overcome the problems associated with supporting these types of instruments by hand from the conventional thumbrest.

One of the conventional methods of relieving the weight on the instrument is to use a neck support strap, similar to that used with much heavier instruments such as the conventional S shaped baritone and bass saxophones. The neck strap includes a hook which fits through an eye formed in the thumbrest. The length of the neck strap is adjusted to position the oboe, clarinet, English horn or straight saxophone at the proper embouchure position for the musician. The weight of the instrument is therefore supported from the musician's neck by the neck strap.

While the well-known neck strap support is effective in relieving the physical strain on the musician's thumb and hand, it causes other difficulties. Over time, the weight of the instrument causes the musician to naturally bend forward at the neck and in the upper chest, altering the musician's posture. The forward bend in the musician's neck and chest region has the very undesirable effect of restricting the amount of air which the musician can inhale and expel through the instrument. The restricted air flow substantially diminishes the tone and intonational qualities of the musical notes which the musician is able to make. In general very few musicians consider a neck strap to be a viable solution to the problem of thumb and hand strain while playing an oboe, clarinet, English horn or straight saxophone.

Other attempts to relieve the musician of holding the instrument have included chest support devices which are attached to the musician's chest and project forwardly to connect to the thumbrest of the instrument. These chest support devices offer little if any advantage over a conventional neck strap support, and in any event have not achieved significant acceptance by musicians.

Another type of support for a clarinet is a wrist strap which extends from the musician's wrist, between the thumb and forefinger and to the instrument at a location near a bell of the instrument. The lower end of the strap is attached by a belt which is attached around the body of the instrument. The length of the strap is adjusted to position the hand in the desired location and to relieve the weight on the thumb. Wrist support devices of this type also Have not achieved acceptance, possibly due to a number of reasons including: the constriction on the hand between the thumb and the forefinger; the different feel of the instrument due to its support near the bell rather than in the middle near the center of balance of the instrument; the requirement to attach the belt to the body of the instrument near the bell; or because of other factors.

Another type of support for some types of musical instruments is an extendable monopod support which is attached rigidly to the instrument to project straight to the floor. The rigid support requires the instrument to be played in a stationary position, which restricts many musicians who prefer to express artistic style by moving while playing the instrument. The rigid extension also has the effect of limiting the orientation of the instrument in the musician's mouth, and may induce additional unnatural forces on the instrument which also makes it harder to play.

A variety of other types of instrument support devices have been created and used for other types of musical instruments, particularly the heavier instruments such as baritones, sousaphones and S shaped saxophones. These other types of support devices are virtually required because of the considerably greater weight of those instruments. In addition, these larger instruments do not require the same physical dexterity necessary for playing the oboe, clarinet, English horn and straight saxophone.

In spite of the variety of different types of support devices for a wide variety of different musical instruments, none of these have proved to offer a solution which is acceptable to musicians. The prior support devices have proved to be too cumbersome, require too much time and care to install and set up for use, have been unreliable from a durability standpoint, or have unreasonably restricted the motion of the musician while playing the instrument. It is with respect to these and other considerations that the present invention has evolved.

SUMMARY OF THE INVENTION

The present invention provides the capability of substantially relieving as much of the weight on the musician's thumb and hand as desired while playing an oboe, clarinet, English horn or straight saxophone, without limiting the position, flexibility or maneuverability of the instrument and without inducing other unnatural or restrictive posture or feel requirements in the instrument. Furthermore, the present invention offers a strut device for an oboe, clarinet, English horn or saxophone which is convenient to use, which does not require the addition of other unnatural feeling apparatus to the instrument, and which may be easily carried and quickly adapted for use with the instrument, and which preserves the normal feel, holding and use of the instrument.

In accordance with its broader aspects, the present invention involves a new and improved extendable strut device for a reed woodwind musical instrument, such as an oboe, clarinet, English horn or straight saxophone. The strut device comprises an attachment component having a connection mechanism adapted to connect pivotally to the thumbrest without interfering with the conventional placement and position of the musician's thumb on the thumbrest. The strut device also includes an elongated monopod component having an upper end connected to the attachment component and having a lower opposite end adapted to contact the seating facility upon which the musician is seated while playing the instrument.

The invention also involves other more limited aspects of the strut device. The connection mechanism allows normal pivoting movement of the instrument relative to the attachment component during playing of the instrument. A latch member is adapted to selectively engage and connect with the thumbrest and to disengage and disconnect from the thumbrest, at a position on the opposite side from that side where the thumb is conventionally placed. The connection mechanism includes a latch member having hook and an actuating handle connected to the hook for moving the hook through an eyelet of the thumbrest and for withdrawing the hook from the eyelet. A slot receives the eyelet therein and the hook secures the eyelet to the attachment component in a manner to accommodate normal movement of the musician when playing the instrument. The connection mechanism may alternatively comprise a rod having a cradle shaped portion which extends under the thumbrest to support the instrument from the monopod component. The monopod component is also selectively adjustable in length and may be formed by a plurality of tubing sections which telescope with respect to one another. A retention mechanism selectively interacts between the tubing sections to retain them in an extended or collapsed relationship. Springs to control the extension and retraction of the tubing section are provided. The lower end of the monopod component includes a friction restraint surface adapted to prevent the lower end of the monopod component from sliding on the seating surface.

In accordance with other of its broader aspects, the present invention involves a new and improved method of supporting a reed woodwind musical instrument at the thumbrest of the instrument while the musician is seated on a seating facility and playing the instrument. The method includes steps of pivotally connecting one end of an elongated monopod strut to the thumbrest without interfering with the conventional placement and position of the musician's thumb on the thumbrest, positioning the other end of the elongated monopod strut on the seating facility upon which the musician is seated while playing the instrument, and establishing a length of the monopod strut to support from the seating facility at least some of the weight of the instrument while the instrument is played.

The invention also involves other more limited steps of the method. The length of the monopod strut may be adjusted to accommodate the particular musician. The pivotal connection is oriented to allow conventional freedom of movement of the instrument while playing the instrument. The lower end of the monopod strut is frictionally restrained against sliding on the seating surface.

A more complete appreciation of the present invention and its scope can be obtained from the accompanying drawings which are briefly described below, from the following detailed description of presently preferred embodiments of the invention, and from the appended claims.

BRIEF DESCRIPTION OF THE DRAWINGS

FIG. 15 is a partial longitudinal section view of the retention spring mechanism shown in FIG. 13, taken substantially in the plane of line 15—15 in FIG. 13.

FIG. 16 is an exploded perspective view of the elements of the retention spring mechanism shown in FIG. 14 shown in assembled relationship.

FIG. 17 is a transverse section view taken substantially in the plane of line 17—17 in FIG. 15.

DETAILED DESCRIPTION OF THE PREFERRED EMBODIMENTS

Figure 1:
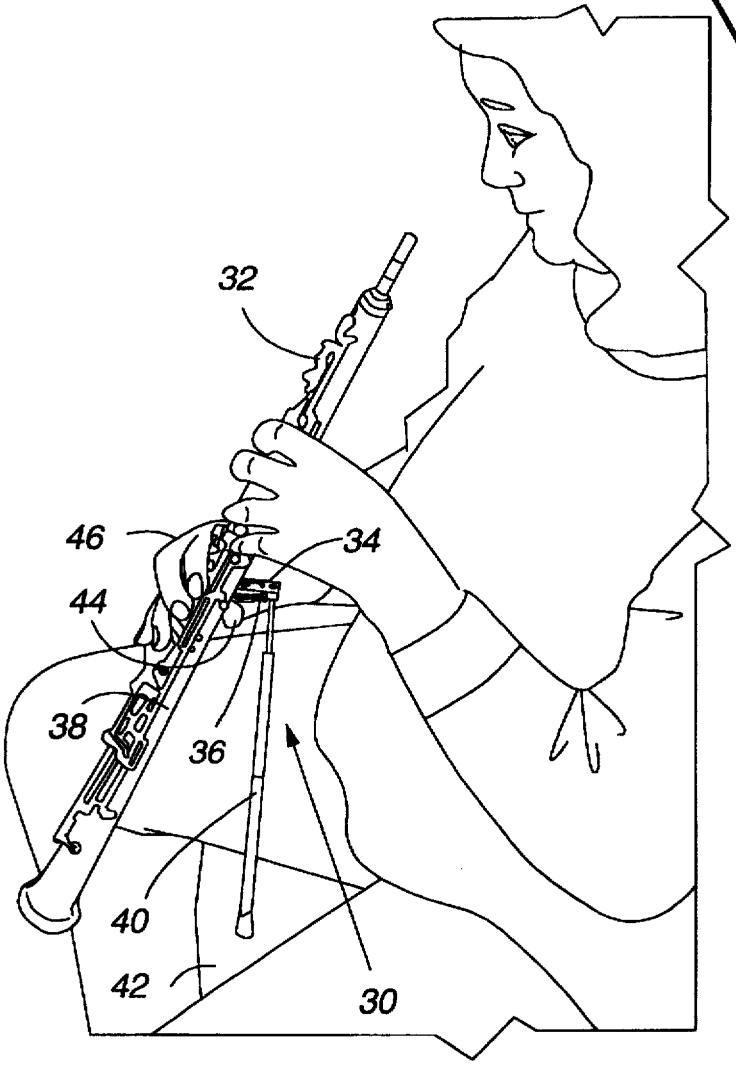
FIG. 1 is a perspective view illustrating use of an extendable monopod strut device of the present invention for supposing an oboe musical instrument while it is being played by a musician.

An extendable monopod strut device 30 for supporting a reed woodwind musical instrument 32, such as an oboe (shown) or clarinet, English horn or straight saxophone (not shown) is generally illustrated in FIG. 1. The strut device 30 includes an attachment component 34 which attaches to a conventional thumbrest 36 extending from a body 38 of the instrument 32. A clarinet, English horn or straight saxophone also includes a thumbrest which is essentially similar to that thumbrest 36 of the oboe shown in FIG. 1. The strut device 30 also includes a monopod component 40. The monopod component 40 is attached at an upper end to the attachment component 34. The monopod component 40 is selectively extendable and adjustable in length to position a lower end of the monopod component 40 in contact with a chair 42 or other seating faciiity upon which the musician is seated while playing the instrument 32. As shown in FIG. 1, an oboe, clarinet, English horn or straight saxophone is played in the conventional manner in a seated position. The strut device 30 is intended to be used when playing the instrument 32 in the conventional manner with the musician seated on the chair 42.

With the attachment component 34 connected to the thumbrest 36, and the lower end of the monopod component 40 resting on the chair 42, the weight of the instrument is substantially supported by the strut device 30. The strut device 30 therefore relieves the musician of having to support the weight of the instrument by the thumb 44 of the musician's right hand 46, which is the conventional manner in which the instrument 32 is supported. As is discussed below in greater detail, the attachment component 34 connects to the thumbrest 36 in a manner which does not interfere with the conventional hand position of the musician, therefore allowing the instrument to be played in the same manner as it would be conventionally played. Because the monopod component 40 may be angled with respect to the vertical, any amount of weight may be transferred to the thumb 44 via the thumbrest 36 should the musician desire to retain some of the weight for purposes of feel. In addition, because the monopod component 40 is adjustable in length, the best length for various playing positions and postures may be established and maintained. Many other advantages will also be apparent from the following description of the components 34 and 40 of the strut device 30.

The attachment component 34 includes main body as shown in FIGS. 2–6. The body 50 is attached at its proximal end to a threaded rod 52 at the upper end of the monopod component 40. The rod 52 is threaded into a threaded hole 54 formed into the proximal end of the main body 50, determined with reference to the position of the musician.

An upper body support assembly 56 is also attached to the upper end of the threaded rod 52 to abut the body 50. The support assembly 56 is formed from an exterior piece 58 of square tubing, into which a piece 60 of smaller square tubing is telescopingly positioned. The inside dimensions of the tubing piece 58 is just slightly larger than the outside dimensions of the tubing piece 60, thereby creating a relatively close fit which prevents the pieces 58 and 60 from twisting in the interfitting position shown best in FIG. 5. A piece 62 of round tubing is placed within the interior opening of the smaller square tubing piece 60. The exterior diameter of the round tubing piece 62 is just slightly smaller than the transverse width of the interior square opening of the smaller tubing piece 60, thus preventing the piece 62 from skewing in position within the interior of the piece 60. The pieces 58, 60 and 62 are attached together and to the rod 52 by bonding to form the support assembly 56. In addition, the support assembly 56 is bonded to the body 50 after the rod 52 has been threaded into the hole 54.

The threaded connection of the rod 52 in the hole 54, and the adjoining contact of the support assembly 56 against the body 50, provide support and stability for the body 50 relative to the rod 52 to withstand the weight from the instrument 32. The weight of the instrument 32 is transferred from the thumbrest 36 to the attachment component 34 by a latch mechanism 64 located at the opposite or distal end of the body 50.

Figure 3:
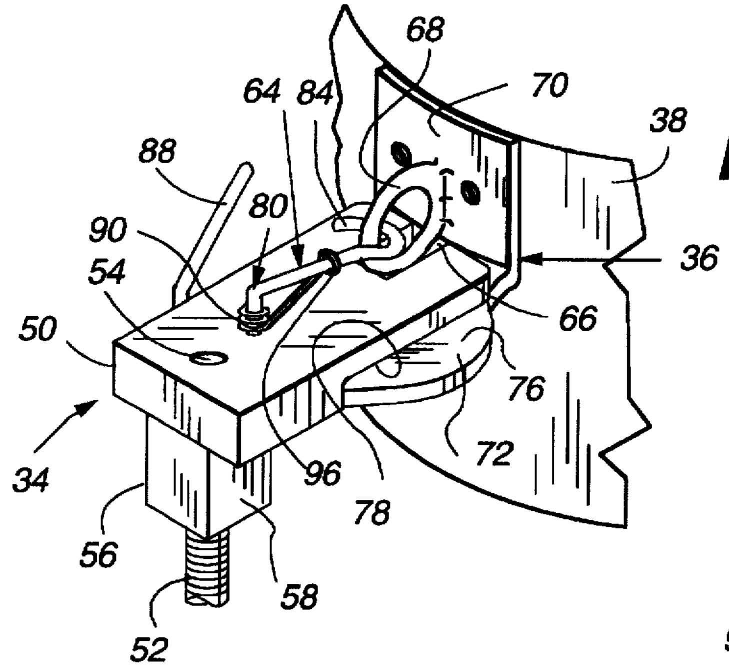
FIG. 3 is an enlarged perspective view of an attachment, component of the strut device shown in FIG. 2, connected to a thumbrest of the oboe shown in FIG. 1.
Figure 4:
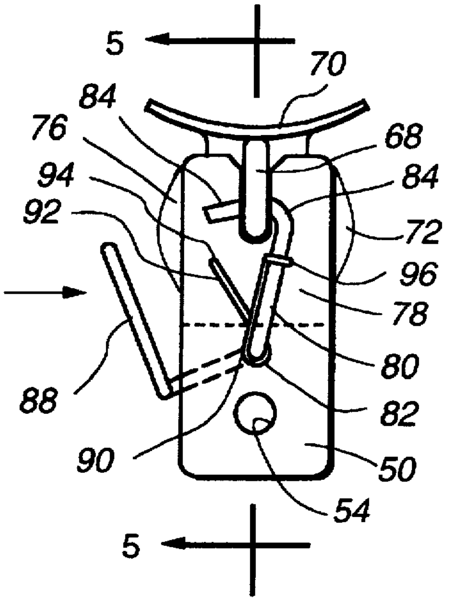
FIG. 4 is a top plan view of the attachment component of the strut device and the thumbrest shown in FIG. 3.

The distal end of the body 50 is bifurcated as a result of a slot 66 formed in the body 50. The slot 66 is intended to receive a wire eyelet 68 of the thumbrest 36. The thumbrest 36 is of conventional construction, having a flange 70 which connects to the body 38 of the instrument 32 and a projection 72 which extends generally perpendicularly from the flange 70. The projection 72 is contacted on a lower surface 74 (FIG. 5) by the thumb 44 of the musician's right hand 46. The eyelet 68 connects to and extends generally between the flange 70 and the projection 72 at the junction of these two pieces 70 and 72. The eyelet 68 therefore extends above an upper surface 76 of the projection 72 and away from the flange 70 of the instrument. The slot 66 formed in the distal end of the body 50 receives the eyelet 68 when the attachment component 34 is connected to the thumbrest 36 as shown in FIGS. 3–5.

A lower portion of the distal end of the body 50 is undercut at 78 to receive the projection 72 of the thumbrest 36. The amount of the undercut is approximately equal to the thickness of the projection 72. When the attachment component 34 is connected to the thumbrest 36 as shown in FIG. 5, the lower surfaces of the projection 72 and the body 50 form a continuum with one another. The continued lower surfaces of the projection 72 and the body 50 allow the thumb 44 of the user to contact and interact with the projection 72 in the conventional manner without unconventional restraints or inhibitions.

The latch mechanism 64 transfers the weight of the instrument 32 to the attachment component 34, because the projection 72 is below the body 50 and therefore does not rest on the body 50. The latch mechanism 64 includes a single rigid shaft 80 which is bent into an appropriate configuration after the shaft 80 is inserted into a hole 82 formed in the body 50. An upper portion (as shown) of the shaft 80 is bent to form a hook end 84. The hook end 84 extends through the center of the eyelet 68 when the latch mechanism 64 is connected to the thumbrest 36. A middle portion 86 of the shaft 80 extends through the hole 82. The middle portion 86 of the shaft 80 pivots in the hole 82 when the latch mechanism 64 operates. A lower portion of the shaft 80 is bent to form an actuating handle 88. The outer portion of the actuating handle 88 normally extends to the side of the body 50, as shown in FIG. 4. In this position, the hook end 84 extends through the eyelet 68, as shown in FIGS. 3–5. When the outer portion of the actuating handle 88 is pivoted to a position adjacent to the body 50, the hook end 84 is withdrawn from the eyelet 68, as shown in FIG. 6. Withdrawal of the hook end from the eyelet releases the connection of the attachment component 34 from the thumbrest 36.

Figure 5:
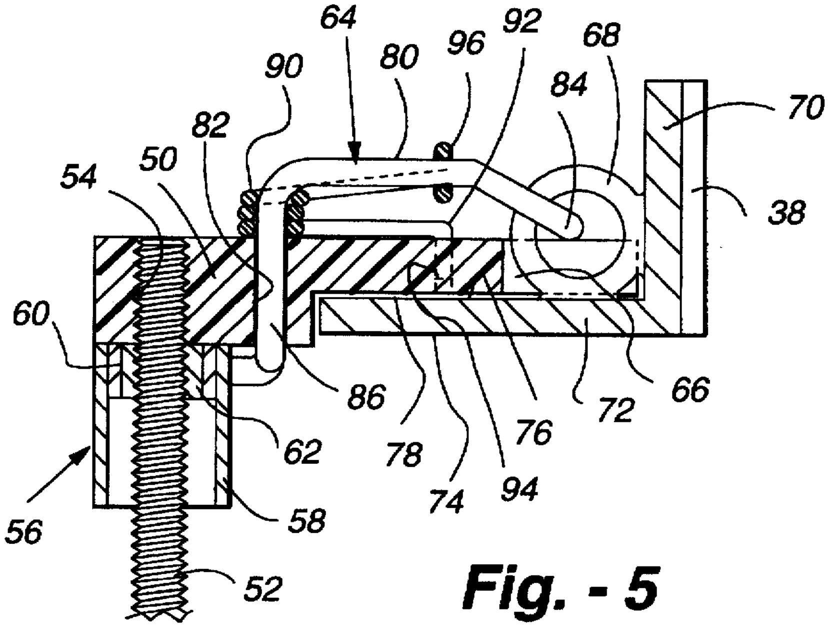
FIG. 5. is a section view of the attachment component and the thumbrest taken substantially in the plane of line 5—5 in FIG. 4.
Figure 6:
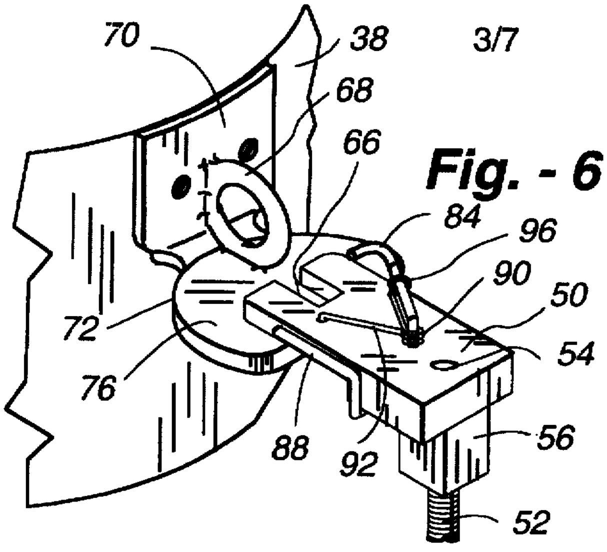
FIG. 6 is a perspective view of the attachment component and the thumbrest shown in FIGS. 3–5, showing the release of the connection to the thumbrest.
Figure 8:
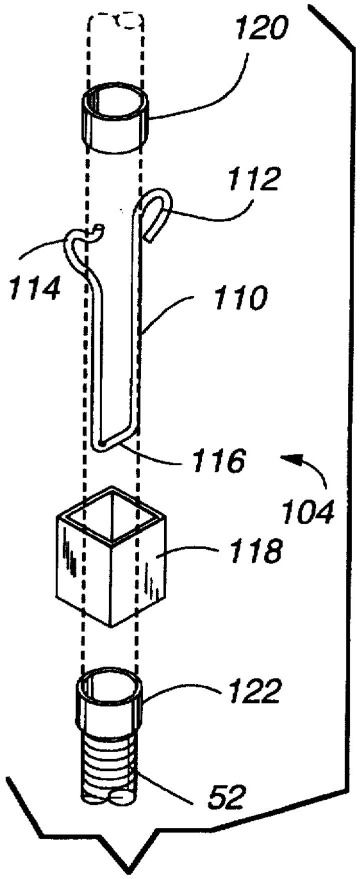
FIG. 8 is an exploded view of some of the elements of a retention nut mechanism of the threaded rod and nut assembly shown in FIG. 7.

The hook end 84 of the latch mechanism 64 is located near the upper inside edge of the eyelet 68 and near the upper surface of the body 50 at the slot 66 when closed, as shown in FIG. 5. The interaction of the projection 72 with the undercut portion of the body prevents the monopod component 40 from pivoting into and contacting the body of the instrument, should the musician pick up the instrument with the strut device 30 attached. Furthermore, the width of the slot 66 restricts the lateral side to side pivoting movement of the monopod component 40 relative to the length of the instrument so the strut device will not twist into an unusable or potentially damaging position. Enough pivoting movement is provided to accommodate the normal and expected side to side movement by the musician while still supporting the instrument, but additional excessive pivoting movement which would not support the instrument is restricted.

A coil spring 90 is connected around the middle portion 86 of the shaft 80. Coils of the spring 90 extend around the middle portion 86 at a location above the upper surface of the body 50 and before the shaft 80 bends from middle portion 86 into the upper portion which forms the hook end 84. One end 92 of the spring 90 extends from the coils to a hole 94 formed in the body 50. The other end 96 of the spring 90 extends from the coils to the upper portion of the shaft 80 at a location short of the hook end 84. The end 96 of the spring 90 is connected in a loop around the shaft 80.

The coils of the spring 90 bias the ends 92 and 96 toward one another under normal circumstances. When the ends 92 and 96 are connected in the hole 94 and around the shaft 80, respectively, the bias from the spring 90 pivots the shaft 80 of the latch mechanism counterclockwise (towards the hole 94) as shown in FIG. 4. The normal spring bias moves the latch mechanism to a normally closed or latched position. Movement of the actuating handle 88 against the body 50, as shown in FIG. 6, requires the musician to apply force to overcome the bias of the spring 90. So long as the musician applies this force to the actuating handle 88, the latch mechanism is in an open or unlatched position. When the actuating handle 88 is released, the spring 90 moves the latch mechanism to the latched position. Thus, positive effort is required by the musician to connect and disconnect the attachment component 34 of the strut device 30 to the thumbrest 36. The normal bias of the spring 90 keeps the strut device 30 connected to the thumbrest 36 when the device is used.

Figure 2:
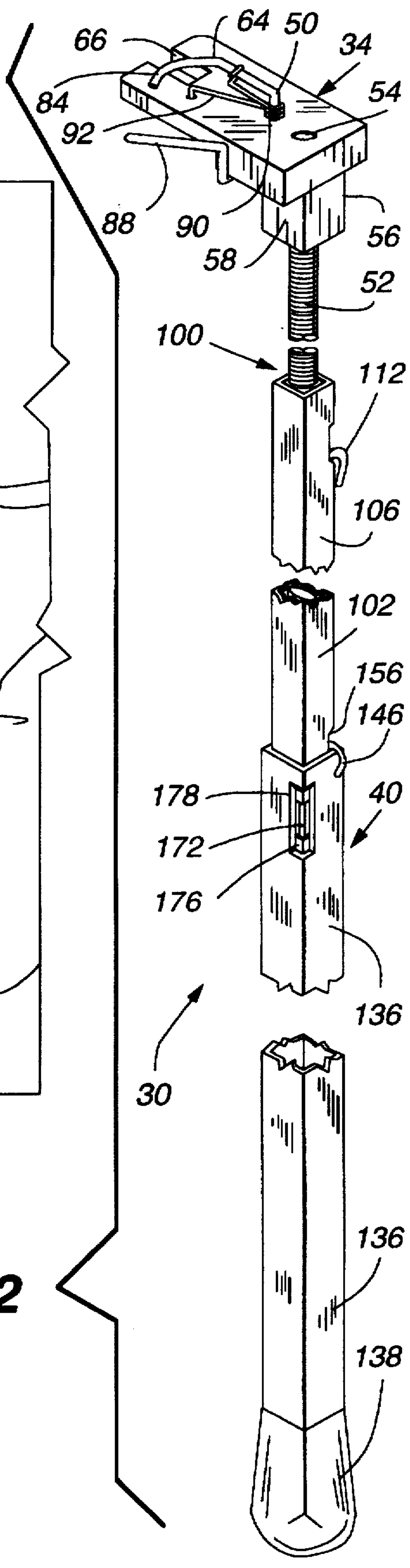
FIG. 2 is an enlarged perspective view of the strut device shown in FIG. 1, with portions broken out.

With the strut device 30 connected to the thumbrest 36 by the latch mechanism 64 of the attachment component 34, the position at which the instrument 32 is supported relative to the chair 42 is established by the monopod component 40, as shown in FIG. 1. In general, the monopod component 40 comprises a fine length adjustment portion, preferably formed by a threaded rod and nut assembly 100, and a coarse length adjustment portion, preferably formed by at least one tubing and retention assembly 102, as shown in FIG. 2. The tubing and retention assembly 102 allows the threaded rod and nut assembly 100 to retract into an upper end of the tubing and retention assembly 102.

Figure 18:
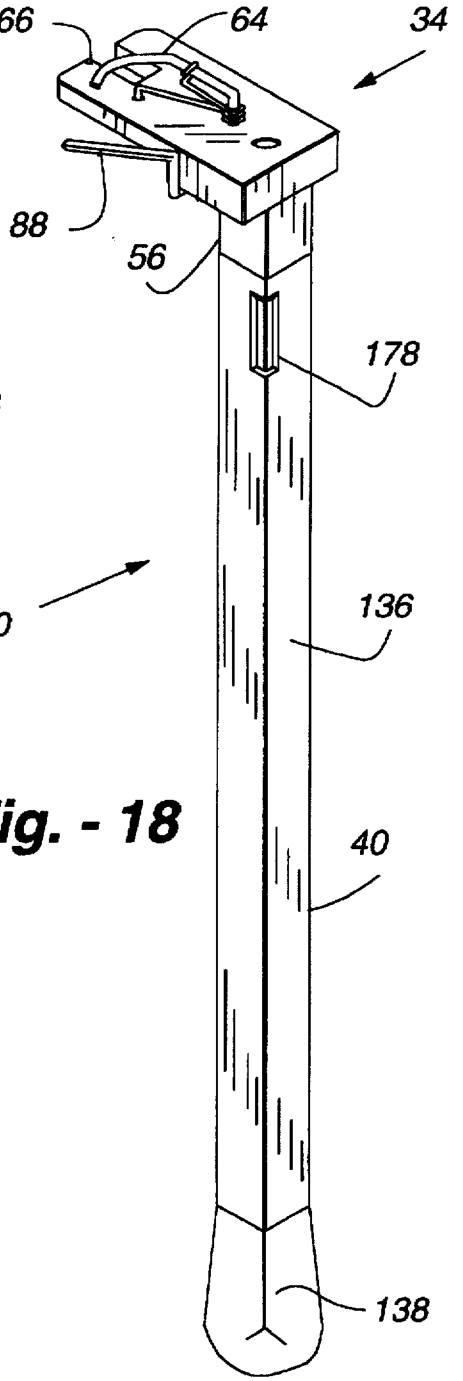
FIG. 18 is a perspective view of the strut device shown in FIGS. 1–17, shown in a completely collapsed condition.

Since the two assemblies 100 and 102 retract with respect to one another, the strut device 30 will collapse to a considerably reduced length, as shown in FIG. 18. In its collapsed position, the strut device 30 is easily carried in a case for the instrument 32, without consuming much space. When used, the threaded rod and nut assembly 100 is extended from the upper end of the tubing and retention assembly 102, and additional tubing and retention assemblies are extended from one another in a telescoping manner. The threaded rod and nut assembly 100 and each tubing and retention assembly includes means for maintaining the extended position of the strut device during use, as is described below.

The threaded rod and nut assembly 100 is shown in greater detail in FIGS. 7–12. The assembly 100 includes the conventional threaded rod 52 which is attached at its upper end by the support assembly 56 to the body 50 of the attachment component 34. The lower end of the threaded rod 52 is connected to a retention nut mechanism 104 which is located within the interior of a square tubing 106 of the uppermost tubing and retention assembly 102. The retention nut mechanism 104 allows the threaded rod 52 to retract into and extend from the upper tubing 106, creates friction force to slightly restrain movement of the threaded rod for control purposes, retains the threaded rod 52 in the extended position and prevents the rod 52 from collapsing during use, and selectively allows the threaded rod to collapse into the tubing 106 when the strut device is not in use.

In addition to connecting to the retention nut mechanism 104, the threaded rod 52 extends through a guide nut assembly 108 which is located at the upper end of the tubing 106. The guide nut assembly 108 guides the threaded rod 52 between its extended and retracted positions within the tubing 106. In addition, the guide nut assembly prevents the threaded rod and the retention nut mechanism from being extended completely out of the tubing 106.

The retention nut mechanism 104 is shown in FIGS. 7–12 as including a wire spring 110 bent into the configuration described. The spring wire 110 extends between an end 112 shaped as a hook and an end 114 shaped with a curved protrusion. Both ends 112 and 114 extend generally between a relatively short middle section 116. The ends 112 and 114 extend generally perpendicularly from the middle section 116 and generally parallel to the rod 52.

The middle portion 116 of the spring 110 is attached within a capture nut or retention assembly. The capture nut assembly includes an outer section of square tubing 118 of relatively short length and of outside dimensions slightly less than the inside dimensions of the tubing 106. As a consequence, the tubing section 118 will slide along the tubing 106 without binding or skewing.

Figure 11:
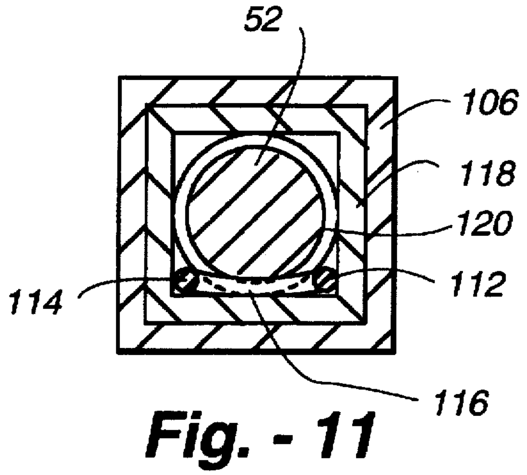
FIG. 11 is traverse cross section view of the retention nut mechanism, taken substantially in the plane of line 11—11 in FIG. 9.

The middle portion 116 of the spring 110 and a portion of the ends 112 and 114 extending a short distance away from the middle portion 116 are located within the tubing section 118. The middle portion 116 generally abuts one side of the inside of the tubing section 118, as is shown in FIG. 11. The portions of the ends 112 and 114 within the tubing section 118 extend generally in the inside corners of the tubing section 118. An upper sleeve 120 is inserted around the threaded rod 52 and into the upper end of the tubing section 118. The upper sleeve 120 holds the portions of the ends 112 and 114 into the inside corners of the tubing section 118, because the thickness of the wire spring 110 is not so great as to protrude against the outside diameter curvature of the upper sleeve 120. The middle portion 116 of the spring 110 contacts the lower end of the upper sleeve 120 to prevent the spring 110 from being pulled upward with respect to the tubing section 118. A lower sleeve 122 is inserted into the bottom of the tubing section 118. The lower sleeve 122 contacts the middle portion 116 and prevents the spring 110 from moving downward with respect to the tubing section 118. The sleeves 120 and 122 are bonded into the interior of the tubing section 118 to thereby permanently attach the wire spring 110 to the tubing section 118. The inside diameter of the sleeves 120 and 122 is approximately the same diameter as the outside diameter of the rod 52.

Figure 9:
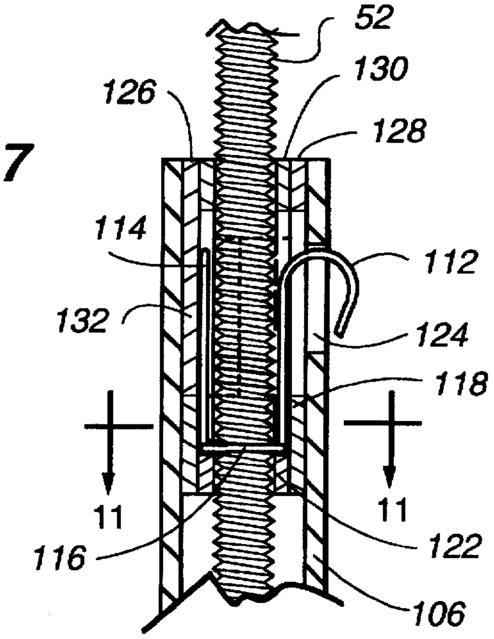
FIG. 9 is a partial longitudinal section view of the threaded rod and nut assembly shown in FIG. 7, taken substantially in the plane of line 9—9 in FIG. 7.

With the retention nut assembly 104 assembled in the manner described, the middle portion 116 of the spring 110 extends in a serration between two adjoining threads of the rod 52, as is shown in FIG. 9. Because the position of the middle portion 116 of the spring 110 is fixed relative to the tubing section 118 by the sleeves 120 and 122, rotation of the rod 52 causes the rod 52 to advance along the serrations between the threads. Consequently, the position of the threaded rod 52 relative to the nut retention mechanism 104 may be adjusted in a fine manner determined by the pitch of the threads of the rod.

Figure 7:
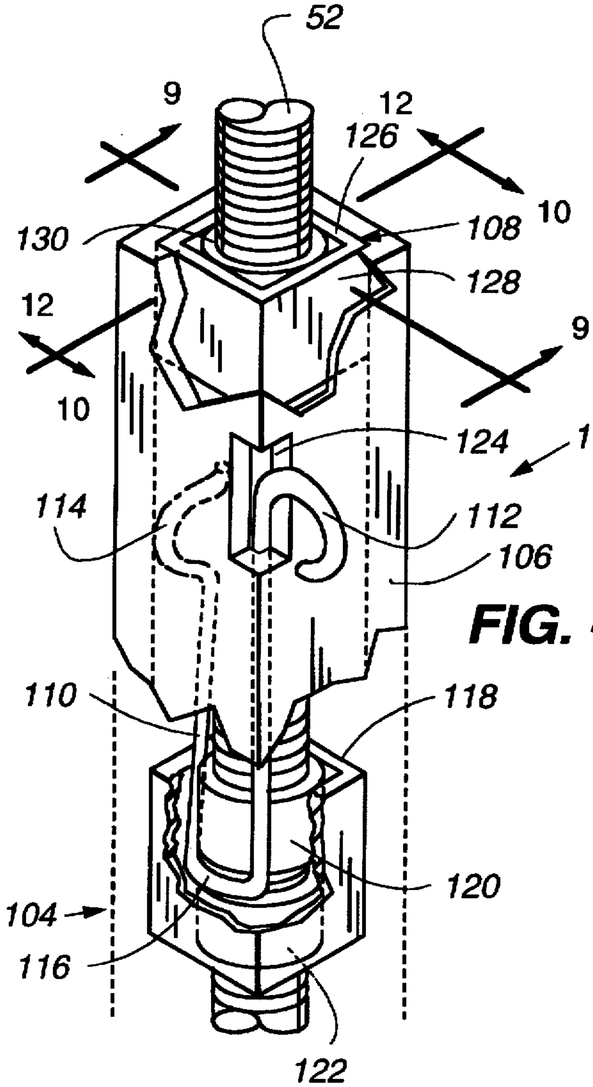
FIG. 7 is perspective view of a threaded rod and nut assembly of a monopod component of the strut device shown in FIG. 2, with portions broken away and shown in phantom.
Figure 10:
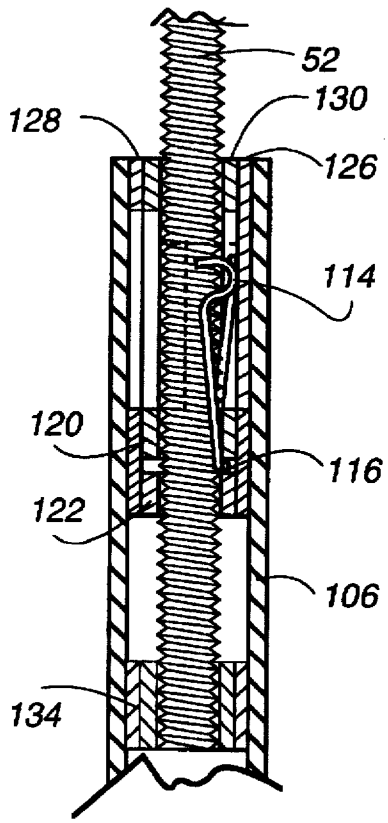
FIG. 10 is a partial longitudinal section view of the threaded rod and nut assembly shown in FIG. 7, taken substantially in the plane of line 10—10 in FIG. 7.

Friction force to restrain the nut retention mechanism 104 against movement in the tubing 106 is supplied by the end 114 of the wire spring 110. The end 114 is deflected inwardly as shown in FIGS. 7 and 10 to cause the protrusion of the end 114 to contact the inside wall of the tubing 106. The force from the spring 110 applied by the protrusion end 114 on the tubing creates friction to restrain movement of the retention nut assembly as the rod 52 is extended or retracted.

When the threaded rod 52 is extended, the nut retention mechanism 104 is held in position by the hook shaped end 112 of the wire spring 110. The end 112 of the spring is deflected into the interior of the tubing 106 when the nut retention mechanism 104 is not in an extended position. In this condition, the hook shaped end 112 also contacts the interior of the tubing 106 and rides along it when the threaded rod is extended. When the nut retention mechanism reaches its outer limit, the hook shaped end 112 deflects into a slot 124 formed in a corner of the tubing 106, as is shown in FIGS. 7 and 9. The hook shaped end 112 protects over the tubing 106 at the lower end of the slot 124. When the nut retention mechanism is pushed slightly downward, the tubing 112 hooks the tubing 106 at the slot and prevents any further downward movement, as is shown in FIG. 2.

To collapse the threaded rod 52 into the tubing 106, the nut retention mechanism is moved slightly upwardly until the hook shaped end 112 clears the edge of the tubing 106 at the bottom of the slot 124. The hook shaped end 112 is thereafter pressed into the slot 124 with finger pressure while the threaded rod is pushed into the tubing 106. Once the hook shaped end 112 moves downward sufficiently to clear the bottom edge of the slot 124, the hook shaped end remains within the interior of the tubing 106.

The guide nut assembly 108 guides the rod 52 as it extends and retracts within the tubing 106. The guide nut assembly is formed by an interior section 126 of square tubing which fits snugly within the interior of the tubing 106. The tubing section 126 includes an upper square portion 128 which surrounds the threaded rod. A sleeve 130 is inserted into the upper square portion 128 to guide the threaded rod 52. The inside diameter of the sleeve 130 is just slightly larger than the outside diameter of the rod 52. The outside diameter of the sleeve 130 is slightly less than the inside dimension of the square portion 128. The tubing section 126 and the sleeve 130 are permanently retained at the upper end of the tubing 106 by bonding.

Figure 12:
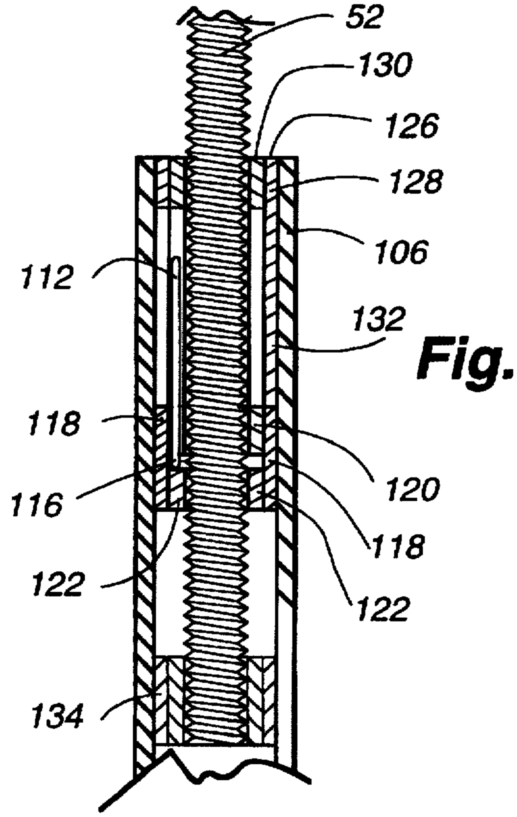
FIG. 12 is a partial longitudinal section view of the rod and nut assembly shown in FIG. 7, taken substantially in the plane of line 12—12 in FIG. 7.

A projection portion 132 extends downward from the square portion 128 along the inside walls of the tubing 106 at a corner, as shown in FIG. 12. The projection 132 is intended to contact the tubing section 118 to limit the amount of upward movement of the retention nut mechanism 104. Limiting the upward movement of the retention nut assembly prevents the ends 112 and 114 of the spring 110 from being damaged by pulling the threaded rod too far upward from the tubing 106. The projection 132 is positioned at a corner of the inside of the tubing 106 where the ends 112 and 114 of the spring 110 are not located.

To add further stability to the threaded rod 52 as it is extended, a cylindrical sleeve 134 is permanently bonded to the lowermost end of the rod 52, as is shown in FIG. 10. The sleeve 134 is Of the same outside diameter as the distance between the inside walls of the tubing 106. The exterior round surface of the sleeve 134 contacts the inside walls of the tubing 106 and allows the rod 52 to rotate as the rod 52 is threaded along the retention nut mechanism 104.

Details concerning the tubing and retention assembly 102, which forms the other major element of the monopod component 40, are shown in FIGS. 13–17. A lower section 136 of square tubing (FIG. 2) does not require a spring retention mechanism 140 (described in greater detail below), because the spring retention mechanism 140 of the assembly 102 is located at the bottom of the section of square tubing 106 (and at the bottom of any additional sections of square tubing), for example. Instead, the lower square tubing section 136 has an elastomer frictional restraint coating 138 formed on the lower end, as shown in FIG. 2. The coating 138 is intended to contact the chair 42 to prevent or restrain the monopod component 40 from slipping off of the chair while the strut device 30 is used. The coating 138 is particularly important in this regard when the musician desires to transfer some but not all of the weight of the instrument to the thumbrest by angling the monopod component 40 at an angle to the vertical when the instrument is being played.

Figure 13:
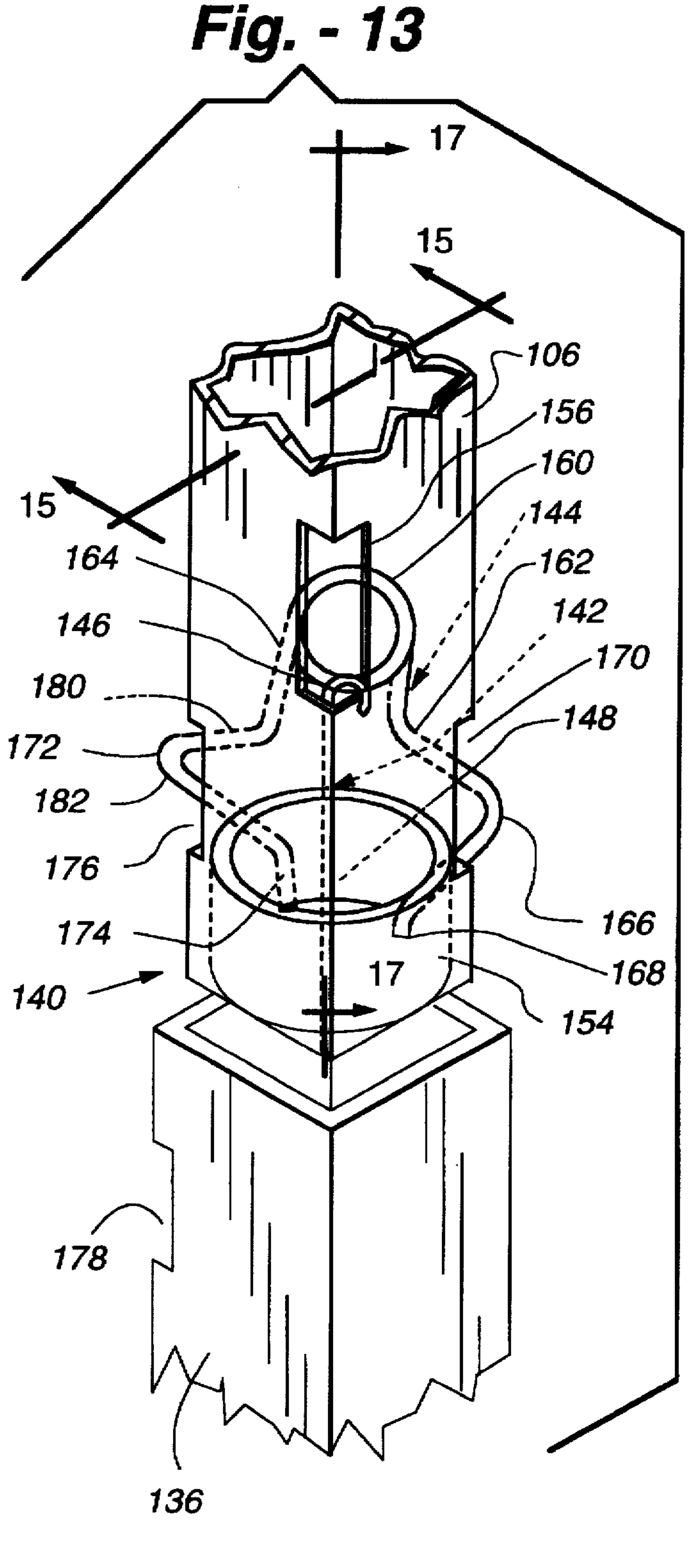
FIG. 13 is a perspective view of a retention spring mechanism of a monopod component of the strut device shown in FIG. 2, with portions broken away and shown in phantom.
Figure 14:
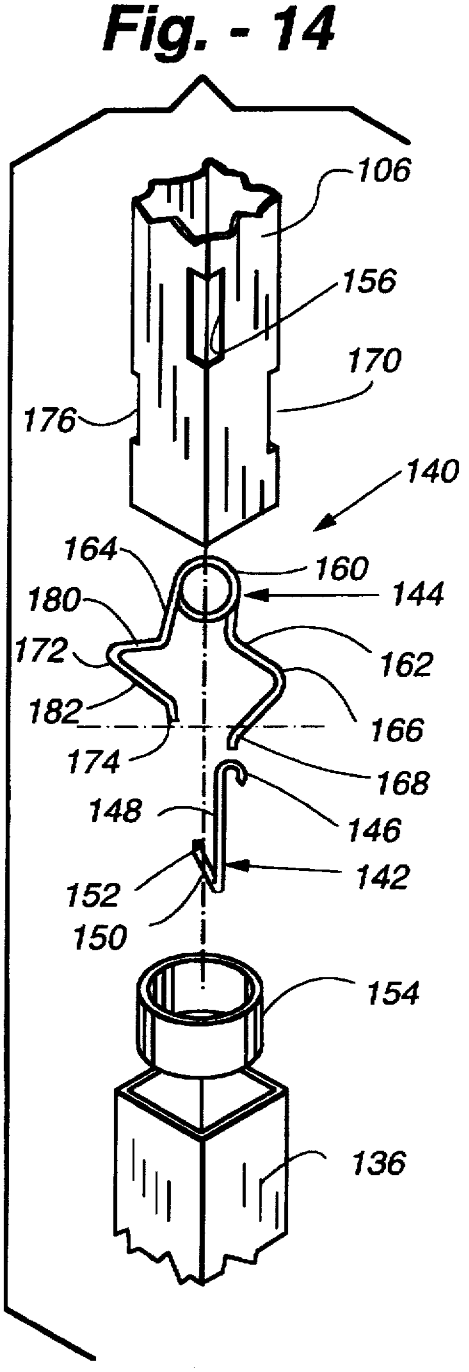
FIG. 14 is an exploded view of some of the elements of the retention spring mechanism shown in FIG. 13.

The spring retention mechanism 140 is shown in greater detail in FIGS. 13 and 14. The mechanism 140 includes a retraction spring 142 which is intended to contact the upper edge of the lower tubing 136 and prevent the tubing 106 to which the mechanism 140 is connected from retracting into the lower tubing 136. The spring retention mechanism 140 also includes an extension and friction spring 144 which prevents the upper tubing 106 from extending out of the lower tubing 136 and which creates resistance to the relative movement of the tubing sections 106 and 136 with respect to one another. The resistance allows the user to better control the extension and retraction of the tubing sections of the monopod component 40.

Only one telescoping tubing and retention assembly 102 is shown formed in the tubing 106. The single assembly 102 interacts with the single lower tubing 136. However, multiple tubing and retention assemblies 102 of essentially similar configurations may be employed in forming the monopod component 40 of the strut device 30. The only requirement is that each assembly must have tubing 106 of a size to telescope into the tubing of the adjacent assembly 102, with the lowermost assembly telescoping into the lower tubing 136.

The retraction spring 142 is formed from spring wire. The spring 142 has a hooked end 146 and an upper leg 148 which extends along an inside corner of the tube 106 and connects to the hooked end 146. The spring 142 also includes a lower leg 150 which connects to the upper leg 148 and extends transversely across the tube 106 to the opposite diagonal inside corner from the corner along which the upper leg 148 extends (FIG. 17). An upstanding end 152 extends a short distance along the opposite diagonal inside corner of the tubing. A sleeve ring 154 holds the upper leg 148 and the end 152 in position in the tubing 106, and thereby retains the retraction spring 142 in position. The sleeve ring 154 is bonded to the tubing 106.

The hooked end 146 projects out of a slot 156 formed in the tubing 106 when the retention spring 142 is permanently positioned in place. As the tubing 106 retracts out of the lower tubing 136 to the point where the slot 156 is exposed above the upper edge of the lower tubing 136 (FIG. 2), the hooked end 146 moves out of the slot 156 and over the upper edge of the tubing 136. Thereafter when the tubing 106 is pushed slightly downward, the hooked end 146 engages the upper edge of the lower tubing 136 to prevent any further retraction, as is shown in FIG. 2. The tubing 106 is thereby retained in the extended position.

To release the extended connection, the tubing 106 is lifted slightly relative to the lower tubing 136, and the hooked end 146 is pushed in to the slot 156 by finger pressure. With the hooked end 146 within the slot, the tubing 106 is pushed downward into the lower tubing 136 without restriction from the hooked end 146. Once the hooked end 146 is below the upper edge of the lower tubing 136, the hooked end 146 may deflect outward against the inside wall of the lower tubing 136. The force from this deflection helps restrict the movement of the tubes 106 and 136 with respect to one another. This restriction force is useful in controlling the extension and retraction of the monopod component 40.

The extension and friction spring 144 (FIGS. 13 and 14) is also formed from spring wire. The spring 144 includes a center coil 160 from which two legs 162 and 164 extend on opposite sides. The leg 162 has a curved protrusion 166 formed in it between the center coil 160 and an end 168 of the leg 162. The curved protrusion 166 extends through a slot 170 formed in one corner of the tubing 106. The curved protrusion 166 contacts the inside corner of the tubing 136 when the tubes 106 and 136 interfit together in the telescoping relationship. The curvature of the protrusion 166 as it extends through the slot 170 makes substantially acute angles with the corner edges of the tubing 106 and contacts the inside corner of the tubing 136 in a normal relationship.

The other leg 164 of the spring 144 also has a curved protrusion 172 formed in it between the center coil 160 and an end 174 of the leg 164. The protrusion 172 extends through a slot 176 formed in a corner of the tubing 106 which is diagonally opposite of the slot 170 which receives the protrusion 166. The protrusion 172 extends through the slot 176 and into another slot 178 formed in a corner of the tubing 136 near the upper end of the tubing 136, when the tubing sections 106 and 136 are telescoped into the extended position, as shown in FIGS. 2 and 15. When the tubing sections 106 and 136 are in the retracted position, the protrusion 172 contacts the inside corner of the tubing 136 in a manner described above with respect to the protrusion 166.

The protrusion 172 is more radically curved than the protrusion 166 at a straight shoulder portion 180. The shoulder portion 180 faces toward the tubing 106 and when projecting through the slot 178 prevents the upper tubing 106 from being withdrawn completely from the lower tubing 136, as is apparent from FIG. 15. However, when the tubing sections 106 and 136 are telescoped into the collapsed position, the other more gently curved portion 182 of the protrusion 172 will ride along the bottom edge of the slot 178 as the upper tubing 106 is forced downward into the lower tubing 136, causing the protrusion 172 to be deflected inwardly and into the inside corner of the lower square tubing 136. In this condition, the protrusion 172 also applies resistance force between the tubing sections to restrict uncontrolled movement.

The center coil 160 of the extension and friction spring 144 applies bias tending to separate to the legs 162 and 164. The spring bias maintains the protrusions 166 and 172 in the slots 170 and 176, respectively, provides the friction force of the protrusions against the inside diagonally opposite corners of the lower tubing, and causes the protrusion 172 to project into the slot 178 in the lower tubing 136 in the maximum extended telescoped position of the tubing sections. Of course, the bias force is not so great as to prevent the collapse of the tubing sections 106 and 136 into the retracted telescoped position.

An alternative arrangement of the retention spring 142 and the extension and friction spring 144 which is not shown involves separating the extension restricting and friction inducing functions of the spring 144 and combining the friction inducing function of the leg portion 166 with the retention spring 142. In reference to FIG. 14, this alternative embodiment is accomplished by extending the end 152 of the retraction spring 142 upward to a greater extent than shown and forming the extended end in the shape of the leg portion 166. Thus the functions of the leg portion 166 and the leg portion 148 are achieved in a single wire spring. With the leg portion 166 removed from the spring 144, its shape is changed to an inverted U shape. The leg portion 164 is formed on one leg of the U shape, a half coil is employed to transition between the legs of the U shape rather than one or more complete coils, and the other leg is essentially straight and fits in the inside corner of the tubing 106 above the slot 170. The same functionality is obtained as has been previously described, even though the structure of the two springs 142 and 144 is changed in this alternative embodiment.

As is apparent from the preceding description, the attachment component 34 of the strut device 30 is easily connected and disconnected from the thumbrest 36 of the instrument 32 by use of the latch mechanism 64. The arrangement of the attachment component 34 allows the musician to use the thumbrest in the conventional manner without disrupting the usual playing posture, position or feel of the instrument. The monopod component 40 is extendable to a length which is adaptable to each individual musician by use of the fine adjustability features of the threaded rod and nut assembly 100 and by use of the telescoping features of the tubing and retention assembly 102. After use, the strut device 30 is collapsed to a relatively short length for carrying in the case for the instrument, as is shown in FIG. 18.

An alternative embodiment of the attachment component 34 may be employed in circumstances where reduced cost of the strut device 30 is desired or when the musician does not desire to attach the attachment component to the thumbrest 36 in the affirmative manner achieved by the latch mechanism 64. One such alternative attachment component 190 is shown in FIG. 19.

Figure 19:
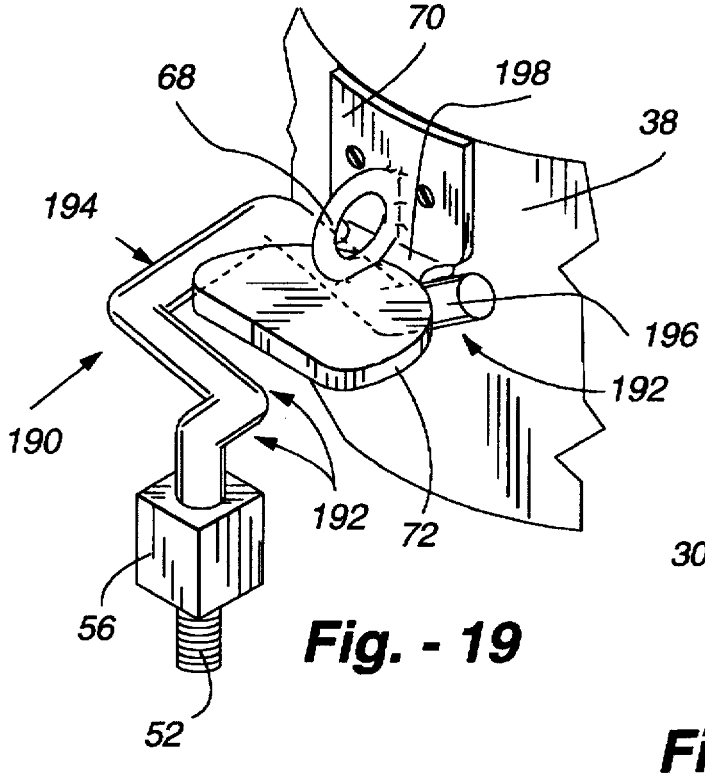
FIG. 19 is a partial perspective view of another embodiment of an attachment component of the strut device shown FIGS. 1–18.

The attachment component 190 shown in FIG. 19 is formed by an unthreaded extension 192 of the threaded rod 52. The support assembly 56 is attached to the rod 52 at the location where the threads end and the unthreaded extension 192 begins. The extension is bent into a rectangular C shaped portion 194, with the C shaped portion 194 extending generally perpendicular to the length of the threaded rod 52. The C shaped portion 194 surrounds the projection 72 of the thumbrest 36 on the left side of the projection. A very shallow V shape is formed in a distal (with reference to the musician) leg 196 of the C shaped portion 194.

The V shaped distal leg 196 forms a shallow cradle which fits below a neck portion 198 of the thumbrest 36 where the flange 70 joins the projection 72 below the eyelet 68. The lowest point of the V shaped distal leg 196 holds the neck portion 198 and restrains the thumbrest 36 from sliding off of the attachment component 190 with the weight of the instrument supported on the strut device. With the C shaped portion surrounding the projection 72 on the left hand side, the thumb of the musician's right hand is free to interact with the thumbrest in an uninhibited manner.

Figure 20:
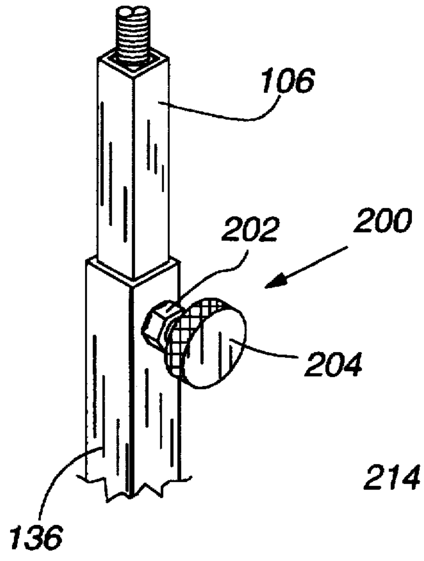
FIG. 20 is a partial perspective view of another embodiment of a telescoping tubing and retention assembly of the strut device shown in FIGS. 1–18.

An alternative embodiment of the tubing and retention assembly 102 may be employed in circumstances where reduced cost of the strut device 30 is desired or when the convenience of the operational features of the retraction spring 142 and the extension and friction spring 144 are not desired. One such alternative tubing and retention assembly 200 is shown in FIG. 20.

The tubing and retention assembly 200 includes threaded nut 202 which is attached to a lower one of the tubing sections, for example 136. A threaded thumbscrew 204 is threaded into the nut 202 by finger pressure. A hole (not shown) is formed into the side wall of the lower tubing 136 so the threaded end of the thumbscrew 204 may project into the interior of the lower tubing 136 when the thumbscrew is tightened. With the upper tubing section, for example 106, inserted within the lower tubing section 136 so that the tubing 106 is adjacent to the nut 202, the thumbscrew may be tightened against the outside wall of the upper tubing 106, thereby holding the two tubing sections 106 and 136 in a fixed relationship with one another. To collapse the strut device, the thumbscrew 204 is loosened to allow the upper tubing 106 to fit within the lower tubing 136. After collapsing the two tubing sections, the thumbscrew 204 may again be tightened to retain the tubing sections in the collapsed position.

Figure 21:
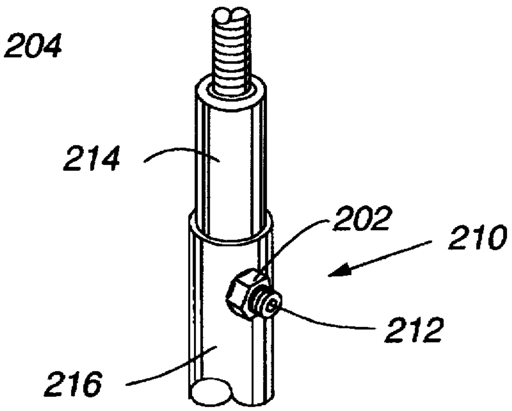
FIG. 21 is a partial perspective view of a further embodiment of a telescoping tubing and retention assembly of the strut device shown in FIG. 20.

A further alternative 210 of the tubing and retention assembly is shown in FIG. 21. The tubing and retention assembly 210 is similar to the tubing and retention assembly 200, except that a socket head set screw 212 is used in place of the thumbscrew 204. The set screw 21 2 is tightened and loosened with an allen wrench or similar tool. The tubing and retention assembly 210 is most useful in circumstances where it is unnecessary to collapse the strut device on a frequent basis. Once the tubing sections 214 and 216 are fixed in position by tightening the set screw 212, the strut device will normally be left in the coarse position established by the position of the tubing sections 214 and 216. Of course, the fine adjustment available from the threaded rod and nut assembly 100 is still available, as it is with the other strut devices using the tubing and retention assembly 200 shown in FIG. 20.

The tubing sections 214 and 216 may be circular in cross section as shown in FIG. 21, rather than square as shown in FIGS. 1–20. Circular tubing sections may only be used where relative rotation of the tubing sections is not a factor, such as with the tubing and retention assemblies 200 and 210 shown in FIGS. 20 and 21.

Presently preferred embodiments of the present invention and many of its improvements have been described with a degree of particularity. This description is of preferred examples and benefits for implementing the invention. The scope of the invention should not be limited by this description, but instead is defined by the scope of the following claims.

The invention claimed:

1. A strut device for supporting a reed woodwind musical instrument at a thumbrest of the instrument and from a seating facility upon which a musician is seated while playing the instrument and supporting the instrument by conventionally positioning the musician's thumb against a lower surface of the thumbrest, the strut device comprising:

an attachment component having a connection mechanism adapted to releasably attach the attachment component to the thumbrest of the reed woodwind musical instrument, said attachment component having a portion adapted to extend away from the thumbrest when releasably attached to avoid interfering with the placement and position of the musician's thumb on the lower surface of the thumbrest while playing the instrument; and an elongated monopod component having an upper end connected to the attachment component and having a lower opposite end adapted to contact the seating facility upon which the musician is seated while playing the instrument.

2. A strut device as defined in claim 1 wherein:

the connection mechanism is adapted to pivotally attach the attachment component to the thumbrest to allow pivoting movement of the instrument relative to the attachment component during playing of the instrument.

3. A strut device as defined in claim 2 wherein:

the connection mechanism includes a latch member adapted to selectively engage and connect the attachment component with the thumbrest and to disengage and disconnect the attachment component from the thumbrest.

4. A strut device as defined in claim 1 wherein the thumbrest includes a flange attached to the instrument, a projection connected to the flange and extending outward from the instrument toward the musician and defining the lower surface under which the thumb is conventionally placed, and wherein:

the connection mechanism is adapted to attach the attachment component to the thumbrest at a position on an opposite side of the projection from the lower surface where the thumb is conventionally placed.

5. A strut device as defined in claim 4 wherein the thumbrest further includes an eyelet extending between the flange and the projection on the opposite side of the projection from the lower surface where the thumb is conventionally placed, and wherein:

the connection mechanism includes a latch member having a hook and an actuating handle connected to the hook and adapted to move the hook through the eyelet and withdraw the hook from the eyelet.

6. A strut device as defined in claim 5 wherein the attachment component further comprises:

a body relative to which the latch member is pivotally connected;

a slot formed in a distal end of the body, the slot adapted to receive the eyelet therein; and a biasing device connected between the latch member and the body to bias the hook into a position extending across the slot.

7. A strut device as defined in claim 6 wherein:

the body is undercut below the slot to a depth adapted to be approximately equal to a thickness of the projection.

8. A strut device as defined in claim 1 wherein the thumbrest includes a flange attached to the instrument, a projection connected to the flange and extending outward from the instrument toward the musician and defining the lower surface under which the thumb is conventionally placed, a neck portion which joins the projection and the flange, and wherein:

the connection mechanism comprises a rod having a cradle shaped portion adapted to extend under the neck portion of the thumbrest to support the instrument.

9. A strut device as defined in claim 8 wherein:

the rod has a C-shaped portion; and the cradle shaped portion is formed in a leg of the C-Shaped portion.

10. A strut device as defined in claim 9 wherein the musician supports the instrument by conventionally positioning the musician's thumb underneath and to one side of the projection, and wherein:

the C-shaped portion of the rod is adapted to extend to an opposite side of the projection from the one side where the thumb is conventionally placed.

11. A strut device as defined in claim 1 wherein:

the monopod component is selectively adjustable in length.

12. A strut device as defined in claim 11 wherein:

the monopod component includes a plurality of tubing sections which telescope with respect to one another.

13. A strut device as defined in claim 12 wherein:

at least one of the tubing sections includes a tubing retention mechanism which selectively interacts with another tubing section to retain the two tubing sections in an extended relationship and to allow the two tubing sections to collapse in a telescoping manner.

14. A strut device as defined in claim 13 wherein:

the tubing sections are hollow;

the tubing retention mechanism includes a retraction spring located within a hollow interior of the one tubing section;

the one tubing section includes a slot for the retraction spring to extend when the two tubing sections are extended;

the retraction spring interacts with the other tubing section when extended from the slot to prevent the two tubing sections from retracting; and the retraction spring is moveable into the slot from a manually applied force to allow the two tubing sections to retract.

15. A strut device as defined in claim 14 wherein:

the retraction spring includes a hooked end which fits over an edge of the other tubing section.

16. A strut device as defined in claim 13 wherein:

the tubing sections are hollow;

the tubing retention mechanism includes an extension spring located within a hollow interior of the one tubing section;

the one tubing section includes a first slot through which the extension spring extends;

the other tubing section includes a second slot through which the extension spring extends when the two tubing sections are extended; and the extension spring interacts with the second slot in the other tubing section to prevent the two tubing sections from extending beyond a predetermined maximum amount.

17. A strut device as defined in claim 16 wherein:

the extension spring is moveable into the second slot as a result of collapsing the two tubing sections.

18. A strut device as defined in claim 11 wherein:

the monopod component includes a fine adjustment segment and a coarse adjustment segment.

19. A strut device as defined in claim 18 wherein the fine adjustment segment of the monopod component further comprises:

a rod having a plurality of serrations formed longitudinally therealong, the rod connecting to the attachment component; and a rod retention mechanism which contacts the serrations at a selected location to hold the rod at a selected extended position.

20. A strut device as defined in claim 19 wherein the monopod component further comprises:

a hollow tubing section into which the rod is collapsed and from which the rod is selectively extended.

21. A strut device as defined in claim 1 wherein:

the lower end of the monopod component includes a friction restraint surface adapted to prevent the lower end of the monopod component from sliding on the seating facility.

22. A strut device as defined in claim 1 wherein the connection mechanism is further adapted to releasably attach the attachment component to a thumbrest of one of an oboe, clarinet, English horn or straight saxophone.

23. A strut device for supporting a reed woodwind musical instrument at a thumbrest of the instrument and from a seating facility upon which a musician is seated while playing the instrument, comprising:

an attachment component having a connection mechanism adapted to connect pivotally to the thumbrest without interfering with the conventional placement and position of the musician's thumb on the thumbrest;

an elongated monopod component having an upper end connected to the attachment component and having a lower opposite end adapted to contact the seating facility upon which the musician is seated while playing the instrument;

the monopod component is selectively adjustable in length and includes a fine adjustment segment and a coarse adjustment segment;

the fine adjustment segment of the monopod component further comprises:

a rod having a plurality of serrations formed longitudinally therealong, the rod connecting to the attachment component, and a rod retention mechanism which contacts the serrations at a selected location to hold the rod at a selected extended position;

the monopod component further comprises a hollow tubing section into which the rod is collapsed and from which the rod is selectively extended;

the rod retention mechanism moves within the hollow tubing section;

the rod retention mechanism includes a retraction spring located within the hollow tubing section when the rod is collapsed into the hollow tubing section; and the retraction spring interacts with the hollow tubing section when the rod is extended to prevent the rod from retracting into the hollow tubing section.

24. A strut device as defined in claim 23 wherein:

the retraction spring includes a hooked end which fits over an edge of the hollow tubing section.

25. A strut device as defined in claim 23 wherein:

the rod retention mechanism includes a friction spring located within the hollow tubing section to create friction against the hollow tubing section when the rod is extended and retracted in the hollow tubing section.

26. A method of supporting a reed woodwind musical instrument at a thumbrest of the instrument while a musician is playing the instrument, comprising the steps of:

pivotally connecting one end of an elongated monopod strut to the thumbrest without interfering with the conventional placement and position of the musician's thumb on the thumbrest;

positioning an other end of the elongated monopod strut on a support surface; and establishing a length of the monopod strut to support from the support surface at least some of the weight of the instrument while the instrument is played.

27. A method as defined in claim 26 further comprising the step of:

adjusting the length of the monopod strut to accommodate the particular musician.

28. A method as defined in claim 26 further comprising the step of:

orienting the pivotal connection to allow conventional freedom of movement of the instrument while playing the instrument.

29. A method as defined in claim 26 further comprising the step of:

frictionally restraining the lower end of the monopod strut against sliding on the support surface.

30. A method as defined in claim 26 wherein the reed woodwind musical instrument is one of an oboe, clarinet, English horn or straight saxophone.

31. A strut device for supporting a reed woodwind musical instrument at a thumbrest of the instrument and from a support surface while a musician is playing the instrument and supporting the instrument by conventionally positioning the musician's thumb against a lower surface of the thumbrest, the strut device comprising:

an attachment component having a connection mechanism adapted to releasably attach the attachment component to the thumbrest of the reed woodwind musical instrument, said attachment component having a portion which is adapted to extend away from the thumbrest when releasably attached to avoid interfering with the placement and position of the musician's thumb on the lower surface of the thumbrest while playing the instrument; and an elongated monopod component having an upper end connected to the attachment component and having a lower opposite end adapted to contact the support surface while the musician is playing the instrument.

* * * * *